PLATED WIRE CONTENT ADDRESSED MEMORY

Filed Dec. 30, 1963

INVENTORS
LESTER M. SPANDORFER
GEORGE A. FEDDE
BY
Rene A. Kuypers
ATTORNEY

United States Patent Office 3,311,901
Patented Mar. 28, 1967

3,311,901

PLATED WIRE CONTENT ADDRESSED MEMORY

George A. Fedde, Norristown, and Lester M. Spandorfer, Cheltenham, Pa., assignors to Sperry Rand Corporation, New York, N.Y., a corporation of Delaware Filed Dec. 30, 1963, Ser. No. 334,114
8 Claims. (Cl. 340—174)

This invention relates in general to a content addressed memory device. In particular, this invention relates to a plated wire content-addressed memory.

For certain problems, such as inventory control, mathematical table look-up, document retrieval, etc., it is desirable to address the memory of a computer by content rather than location. In a content-addressed memory every filled location can be addressed by any or all of its contents. Since searching functions are performed this way, neither an address register or selection matrix is required to perform a search of the memory as with conventional location addressed systems. However, a selection matrix is employed in a writing operation. The content addressed memory can be searched rapidly in a single cycle of operation whereas a location addressed system must be queried word by word, thereby making memory search time considerably longer and undesirable for many operations.

It is therefore an object of this invention to provide a new and improved content address memory device.

It is a further object of the instant invention to provide a new and improved plated wire content address memory device.

It is yet a further object of the instant invention to provide a new and improved plated wire content address memory having a non-destructive readout capability.

It is still a further object of the instant invention to provide a content addressable device which incorporates a new and improved memory oganization.

In accordance with a feature of this invention, a plurality of plated wires, which are adapted to be connected to individual detector devices, are arranged contiguous to one another. Each of the plated wires incorporates a thin magnetic film formed on the surface of a small diameter wire substrate. The thin magnetic film is magnetizable in a first and second direction along the "easy" axis thereof. Arranged substantially perpendicular to the plated wires are a plurality of non-magnetic drive lines, which are connected to respective pulse generators. Unlike the conventional random-access memory system in which a word lies along the length of a single drive line and the plated wire serves as a bit line, the content address structure is in effect transposed 90 degrees. In other words, the plated wire connected to a detector device contains all of the bits of one word, thus serving as a word register, and the non-magnetic drive line serves as the bit drive line.

In accordance with a further feature of this invention, the operations or functions that are incorporated in the content-address memory are those of write, search or interrogate and read. The write function is accomplished in a two-step sequence. First, all the bits of the plated wire word register are reset to an arbitrary "zero" by simultaneously driving current into all drive lines and into the plated wire. Next, the drive lines which correspond to a "one" in a required word are driven, and those which correspond to "zero" are not driven and simultaneously the plated wire line is pulsed. Thus whenever a coincidence of current in a particular drive line and a plated wire occurs a "one" is written, and where no coincidence occurs, the wire remains reset to "zero."

During the search and read operation, a "zero" voltage will be sensed in the detector if the information searched and the information stored in a certain bit position of the content address memory is the same. On the other hand, if the information searched and the information stored is dissimilar thereby indicating that a mismatch exists, then the detector will see at least one unit of voltage.

In accordance with another feature of this invention, a bit of a word register stored along the plated wire sense line is represented by a binary datum or code. In order to obtain this coding arrangement, at least two non-magnetic drive lines are positioned perpendicular to the plated wire and at each intersection thereof, the plated wires are magnetized along the "easy" axis as either a binary "one" or a binary "zero." Thus, if it is required to store a "one" bit of information in a particular location of a content address memory word register, the first and second positions along the plated wire associated with the two drive lines are respectively magnetized as a binary "one" and "zero." On the other hand, if it is required to store a "zero" bit of information, the magnetization at the corresponding first and second positions mentioned above are magnetized oppositely (i.e., as a binary "zero" and "one").

The detector device connected to the plated wire sense line is biased in such a way that if the contents of the associative memory word register are searched, by energizing one of the two drive lines mentioned above, the voltage induced in the plated wire sense line will be cancelled by the bias of the detector if the information searched and the information stored are the same. It follows that if the second of the drive lines had been energized during a search cycle and the magnetization at the first and second positions had been reversed, the signal induced in the plated wire would again be negatived by the bias in the detector thereby indicating a "match." In other words, by means of the binary coding arrangement along two juxtaposed positions along the plated wire, a bit position of a certain word register can be interrogated for an information "zero" or "one" bit by energizing one of two non-magnetic plated wire drive lines. The combination of the induced signal and the bias of the detector determines whether a "match" or "no match" condition exists between the information stored at the bit position and the information being interrogated.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawings, wherein:

Figures 1, 2, 3:
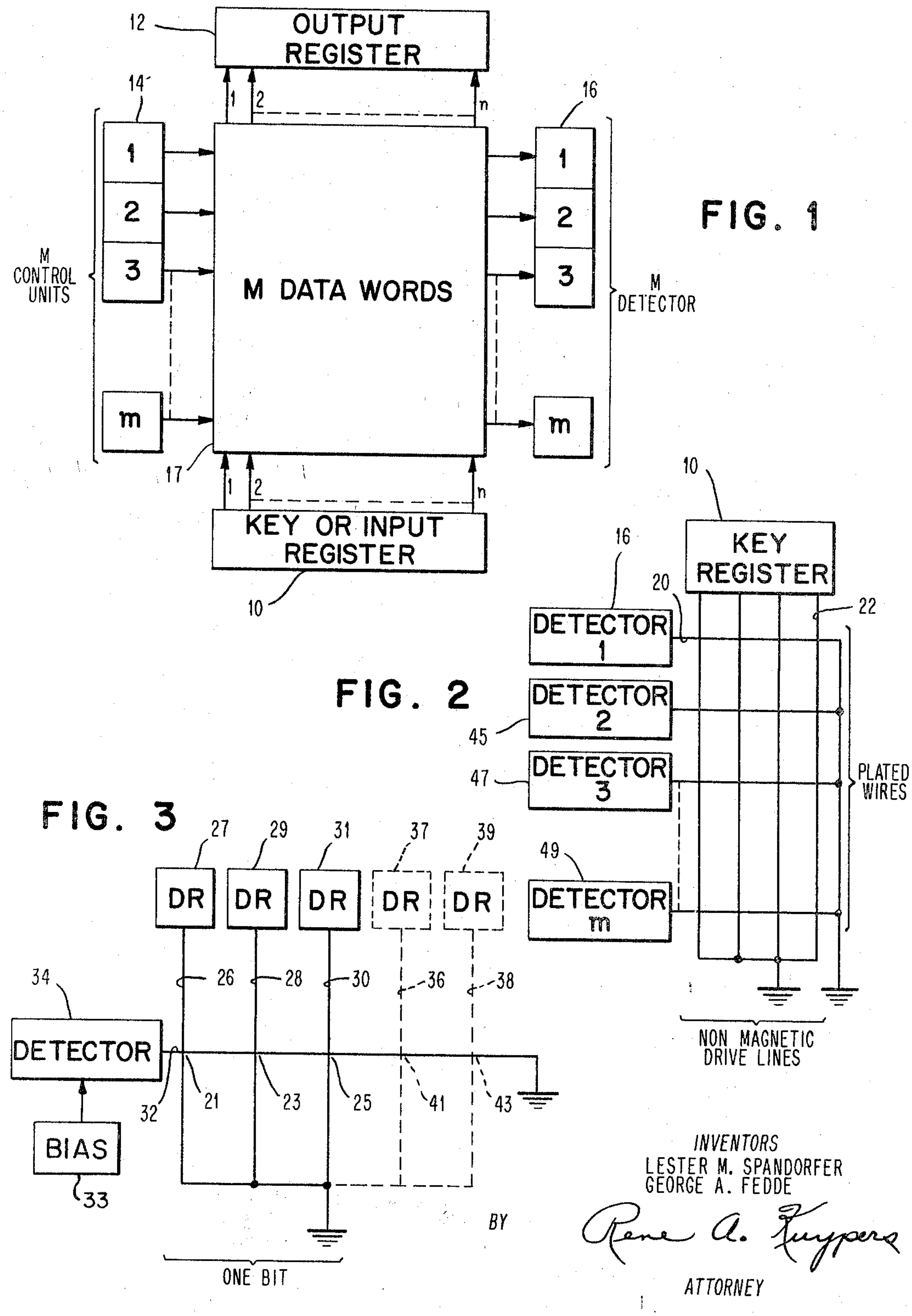
FIGURE 1 depicts the general organization of a content-address memory including its associated circuitry in block form.
FIGURE 2 shows a plated wire content-address memory embodying the basic features of the memory of FIGURE 1.
FIGURE 3 depicts the formation and organization of a single information bit of a content-address memory word register wherein the solid lines represents a three drive line embodiment and the solid and dotted drive lines together represent a five drive line embodiment.

The instant invention provides a content-address memory (hereinafter referred to as an associative memory) incorporating a thin film, plated wire and drive line as a basic building element. In order to more fully appreciate the plated wire techniques of the instant invention, the following background material is presented on the associative memory in general. Conventional digital computer memories today are typically word-organized, random-access devices. To enter an item of information into the memory of these systems, the location or address has to be assigned and selected, using the address register and selecting matrix. Hence, this type of memory may be called location addressed. Computer operations are usually performed by sequencing through all or part of the memory until a desired logical operation is achieved. With increasing larger memories, memory searching time becomes prohibitively long. Therefore, for certain problems, it is desirable to address the memory by content rather than location. Thus, every full location can be addressed by any or all of its contents. Because all addressing functions are performed this way, neither an address register nor selection matrix is required for the search operation, as mentioned earlier.

The main function of an associative memory is to compare a desired data word to the entire contents of the memory by interrogating all of the memory at one time (i.e., in one memory cycle). The functions of an associative memory can be described more clearly in a specific problem relating to the cataloguing of books in a library. Each memory word might contain the title, the author's name, subject and shelf location of a book. Each category of information would be restricted to a specific portion of the word. If the book is to be listed under several subjects, it would be entered into several locations.

To find the required information, the title of the book is entered into the input-output register or key register (explained in more detail hereinafter). The system is then switched into its comparison mode wherein the information sought is simultaneously compared with the corresponding position of every storage location. Whenever a matching location is found (i.e., whenever the title stored in a location matches that in the input-output register), the system can be switched to its readout mode in which all contents for the matching location are duplicated in the input-output register. It is thus readily apparent, that it is not necessary to sequence through all of the memory addresses as in the case of a location addressed memory device to find certain information, but rather as soon as the information is found it can be operated upon.

The power of an associative memory is greatly increased if some method is provided to select certain bits in the input register for the compare operation. This selection of certain bits of the input register is called keying or masking and takes place in the key register. The typical example would be a table lookup operation such as finding the sine of a given angle. Conventional digital computers usually solve this problem by some iterative process such as a power series; that is, $$\sin x = x - 1/6\ x^3 + 1/120\ x^5 - 1/5040\ x^7 + \ldots$$

here, a number of add, subtract, multiply and divide operations are required, which is time consuming. With an associative memory, a sin $x=y$ table could be used. Each word in the table would contain the following information, angle, sine value of the angle, and interpolation value. To obtain the sine value, the compare operation would be performed only on the data bits representing the angle. The sine value of the angle and the interpolation values are masked out of the compare operation. Thus by masking, the location of the desired angle and its sine value can be readily found. A read operation is performed following the compare operation at the indicated address to obtain the actual stored information. The sine value and the interpolation values are then transferred to a standard arithmetic unit for one multiplication and add operation to obtain for example the sine of 43.17 degrees.

Referring now to the drawings, and in particular to FIGURE 1, a simplified block diagram of an associative memory is depicted. The memory has a capacity of $m$ data words of $n$ bits each. Associated with each word is a control unit 14 and a detector unit 16. Also shown are a key register 10 and an output register 12. The bit positions in both the input and output registers are connected to the corresponding bit positions of the $m$ data words. The operation is as follows: a word is written into the memory without specification of an address. The word is written into the first unused word register and this operation is controlled by the system of control units 14 and the input register 10. A word or group of words of the $m$ data words in the memory can be tagged simultaneously as a result of an association between the bits or a set of the bits in the key register and the corresponding bits in the memory. The bits in the key register for which association is sought are called the key bits and form the key word. The key bits are formed from the full word in the key register by an arbitrary masking operation. If one or more memory words match the key bits, the corresponding detectors are excited; all other detectors are non-excited. The excited detectors thus identify the match or equality condition, and in conjunction with the control units call for the one at a time readout of all bits of each tagged word into the output register 12. This readout and the sensing which excites the word detector are both non-destructive readout as will be explained in more detail hereinafter.

Referring now to FIGURE 2, there is shown a thin film, plated wire associative memory designed within the framework of the memory discussed with regard to FIGURE 1. Thus, the memory comprises a plurality of horizontal plated wires 20 which are positioned in juxtaposition to one another. The plated wires 20 are typically a five mil diameter beryllium copper substrate upon whose surface is formed a thin, magnetic film. The thin, magnetic film is electroplated on the wire surface with approximately a 10,000 Angstrom thickness of Permalloy (80% nickel–20% iron). The Permalloy coating is electroplated in the presence of a circumferential magnetic field that establishes a uniaxial anisotropy axis at right angles (i.e., around the circumference) to the length of the wire. The uniaxial anisotropy establishes an "easy" and "hard" direction of magnetization and the magnetization vectors of the thin film are normally oriented in a first or second equilibrium position along the "easy" axis, thereby establishing two bistable states necessary for binary logic application. Each of the plated wires 20 is connected to respective detector devices 16.

Placed substantially perpendicular to the equally spaced bit wires 20 are a plurality of equally spaced and parallel non-magnetic drive lines 22. These straps may be of a single-turn solenoid configuration, in which event one leg of the solenoid would extend over the top surfaces of the plated wires 20 and the second leg or return thereof would extend on the under surface of the plated wires. In normal practice, however, the drive lines 22 may simply comprise a first strap which is typically 20 mils wide and placed on 40 mil centers. The drive lines 22 may be supported by a flexible one mil glass-epoxy or mylar dielectric sheets (not shown) as is customary in the art. Alternately, the plated wires 20 may be supported by a current conducting ground plane (not shown) or non-conducting member. Each drive line 22 is connected to a respective pulse generator, all of which are incorporated in the key register 10. The non-magnetic drive lines 22 as well as the plated wires 20 are each shown to be grounded as are the detectors 18 and the pulse generators in the key register 24, in order to indicate that a closed circuit path exists between required circuit elements.

The associative memory depicted in FIGURE 2 is unlike the conventional plated wire, word-organized, random-access device. In the conventional word-organized, plated wire memory, the entire word lies along the length of a drive line 22 and the plated wires 20 serve as a bit line (i.e., a binary bit of information is stored at the intersection of the plated wire 20 and the drive line 22). However, the plated wire associative memory of FIGURE 2 is in effect transposed 90 degrees, that is, the plated wires 20 contain all the bits of one word, thus serving as a word register, and the non-magnetic line 22 serves as a bit drive line. In other words, when a search cycle is initiated, the required pulse generators of the key register 10 are all energized thereby inducing respective voltages in each of the plated wires 20. As is well understood in the art and therefore will not be discussed in great detail here, the energizing of the drive line causes the magnetization vectors at a certain position along the "easy" axis of the plated wire to rotate through an angle less than 90 degrees toward the "hard" axis of magnetization. Because the rotation is less than 90 degrees, the instant invention has a non-destructive readout capability. The induced voltages in each of the plated wires 20 because of the vector rotation are sensed by the respective detector devices 16. It is therefore readily apparent that the associative memory device of FIGURE 2 operates differently from that of a random-access, word-organized memory in that in the associative memory technique, a plurality of non-magnetic drive lines are simultaneously energized in order to search for specific information, whereas in the word-organized memory, only a single non-magnetic drive line is energized at one time.

As briefly mentioned above, the write cycle is accomplished in a two-step sequence. Firstly, all bits of a plated wire word register are reset to an arbitrary "zero" by simultaneously driving current into all drive lines 22 and into a plated wire 20. Current is driven into the plated wire by means of word drivers (not shown), and the non-magnetic drive lines are energized by means of the digit pulse generators in the key register 10. Next, the drive lines 22 which correspond to "one" in the key word are driven with either the same or opposite polarity to that used in the first step, and those which correspond to "zero" are not driven and simultaneously the required plated wire 20 is pulsed with an opposite polarity current to that used in the first step. The presence of the current in the plated wires tilts (i.e., adds the necessary additional movement) the magnetization vectors towards the desired "easy" axis of orientation so that after the digit pulse generator current is turned off, the magnetization vectors rest in the desired "one" direction. The magnitude of the word current in the plated wires 20 required for the write operation is small because the current in the non-magnetic drive lines 22 rotates the magnetization vectors to almost 90 degrees from the "easy" axis and the bit current flux field is only required to steer the magnetization vectors several degrees beyond the 90 degree position. The additional circuitry required to write new information into the associative memory of FIGURE 2 such as digit drivers and a word selection matrix are not depicted in the drawings, since this circuitry is conventional in the plated wire memory art.

The search technique as employed in the instant invention is discussed in greater detail in FIGURE 3. In one embodiment, a single bit position is depicted in FIGURE 3 as comprising three contiguous drive lines 26, 28 and 30 (bracketed) placed substantially perpendicular to a plated wire 32. The plated wire 32 as well as the non-magnetic drive lines 26, 28 and 30 are connected to required circuitry, namely, the detector 34 and the pulse drivers 27, 29 and 31. It should be understood from previous discussions herein that the pulse drivers when energized simultaneously comprise the key register. The intersections of the non-magnetic drive lines 26, 28 and 30 with the plated wire 32 form sections 21, 23 and 25 of the single bracketed bit position. The portion 21 of the bit position which is magnetized as a binary "one" will induce a positive signal in the sense line 32 when energized by a read pulse in the drive line 26, whereas if the section 21 is magnetized as a binary "zero," a negative signal will be induced in the sense line 32. In order to clarify further discussions, the bracketed bit of information will be called either a "zero" or "one" bit of information to distinguish the bit sections 21, 23 and 25, which are magnetized as positive bits and negative bits. In view of the convention just discussed, the Interrogation Truth Table may now be referred to below.

INTERROGATION TRUTH TABLE

| Stored | Search | |
|---|---|---|
| | 0 | 1 |
| 0 | No voltage | +e |
| 1 | +e | No voltage |

The basic operation of the associative memory of the instant invention relates to the above in that if a "zero" bit of information is stored in a certain location of the memory and it is required to search for a bit of "zero" information, a "no voltage" input will be received by the detector. A "no voltage" input to the detector indicates that a "match" exists between the information stored and the information searched. On the other hand, if a mismatch exists, the detector will see at least one unit of positive voltage ($+e$). This occurs if, for example, a portion of a word register contains an information "one" bit and a search is made for a "zero" information bit.

In order to implement the Interrogation Truth Table above for a plated wire arrangement, three $n$ bit positions are required for an $n$ bit word. In other words, as depicted in FIGURE 3, three drive lines are required per bit position and these drive lines are designated as 26, 28 and 30. In order to more clearly see how three drive lines are required to represent a single bit of information in the associative memory of the instant invention, the following Table of Operations is provided.

TABLE OF OPERATIONS

| | Energize | Store 1 | | | Store 0 | | |
|---|---|---|---|---|---|---|---|
| | | a | b | c | a | b | c |
| Search 1 | b<br>c | +1 | −0<br>−e | +1<br>+e | −0 | +1<br>+e | +1<br>+e |
| Sum | | | | (o)e | | | +2e |
| Search 0 | a<br>c | +e | | +e | −e | | +e |
| Sum | | | | +2e | | | (0)e |
| Mismatch=+2e | | Match=(0)e | | | | | |

The above Table of Operations indicates that in order to store a "one" bit of information, the sections 21, 23 and 25 (corresponding respectively to the columns *a*, *b* and *c*) must be magnetized along the "easy" axis of the plated wire 32 as a binary "one," as a binary "zero" and as a binary "one." In other words, the "one," "zero," "one" representation corresponds to a binary code or binary datum necessary to store a "one" bit of information in the associative memory. Similarly, in order to store a "zero" bit of information, the above-mentioned sections must be magnetized as a binary "zero," as a binary "one," and as a binary "one."

The *e*'s in the Table of Operations indicate those drive lines (i.e., 26, 28 and 30 in FIGURE 3) that must be energized during the interrogation cycle of the memory. Therefore, whenever the key register requires that a search be made for an information "one" bit, the two drive lines associated with columns *b* and *c* (i.e., drive lines 28 and 30 in FIGURE 3) must be simultaneously energized. As mentioned in a previous paragraph, by magnetizing a section as a positive bit, a ($+e$) voltage will be induced in the sense line and similarly when a section is magnetized as a negative bit, a ($-e$) voltage will be induced in the sense line. Therefore, by energizing lines 28 and 30 by means of the drivers 29 and 31 when an information "one" bit is being stored in a certain location of a word register, a "match" condition is achieved and substantially no voltage is sensed by the detector 34. In like manner, if a bit position in FIGURE 3 had been magnetized so as to store a "zero" bit of information, then the sections 21, 23 and 25 would be magnetized in accordance with a binary code to correspond to columns *a*, *b* and *c* of the Table of Operations (i.e., as a "zero," "one," "one"). If therefore the key register requires that a search be made for a "zero" bit of information, then the drive lines 26 and 30 would be simultaneously energized and substantially no voltage would be sensed by the detector 34 to indicate that a "match" condition is present.

It is further apparent from the Table of Operations that if the bit position represented in FIGURE 3 was magnetized to store a "one" information bit and the key register required that a search be made for a "zero" information bit by energizing drive lines 26 and 30 (corresponding to columns *a* and *c*) a voltage of substantially $(+2e)$ would be sensed by the detector 34. This results from the fact that a $(+e)$ voltage would be induced at the bit section 21 and a $(+e)$ voltage would be induced at the bit section 25 of the sense line 32. This voltage would be interpreted as a "mismatch" or "no match" condition of the associative memory. It is further apparent that if the bit positions in FIGURE 3 had stored a "zero" bit of information in accordance with the binary code or binary datum represented in the Table of Operations, then by energizing drive lines 28 and 30 (i.e., corresponding to columns *b* and *c*) a voltage of substantially $(+2e)$ would again be sensed by the detector 34. This voltage would also be interpreted as a "mismatch."

It should be noted by referring to the Table of Operations that the *c* column corresponding to the drive line 30 is magnetized as a binary "one" irrespective of whether a "one" or "zero" bit of information is stored in the associative memory. It should be also observed that when searching for a "zero" or "one" bit of information, the drive line 30 is always energized. In view of this observed fact, the *c* column or the drive line 30 can be eliminated from the three drive line scheme and a D.C. bias can be substituted therefor. This bias 33 may be applied to the detector device 34 in accordance with well known techniques and has a value of $+ne$ (i.e., where $n$ equals the number of bit positions in the key word). If the D.C. bias 33 is applied to the detector device 34, then any bit position of a word register can be represented by two drive lines. In all other respects, the operation would follow that of a three drive line arrangement as discussed with respect to FIGURE 3 and the Table of Operations above. Thus, the sections along the plated wire 32 would be magnetized in accordance with columns *a* and *b* for an information "zero" or "one" bit. Furthermore, it would be necessary to pulse one drive line for a "zero" or "one" search.

A variation of the above-discussed techniques results in a reduction to 2.5 drive lines per bit if the information set or datum follows that shown in the table below.

TABLE

| | a | b | c | d | e |
|---|---|---|---|---|---|
| Store 11 | 0 | 1 | 1 | 1 | 1 |
| Store 10 | 1 | 0 | 1 | 1 | 1 |
| Store 01 | 1 | 1 | 0 | 1 | 1 |
| Store 00 | 1 | 1 | 1 | 0 | 1 |
| Search 11 | x | – | – | – | x |
| Search 10 | – | x | – | – | x |
| Search 01 | – | – | x | – | x |
| Search 00 | – | – | – | x | x |

Here bits are grouped into information sets or pairs wherein five magnetized sections and five drive lines are required to represent a set. In all other respects, however, the operation follows that described with respect to the above-discussed Table of Operations employing two or three drive lines per bit position. The drive lines associated with the five columns (*a*, *b*, *c*, *d* and *e*) correspond respectively to the five drive lines 26, 28, 30, 36 and 38 in FIGURE 3. By way of example, if the sections 21, 23, 25, 41 and 43 provided by the intersections of the drive lines 26, 28, 30, 36 and 38 with the sense line 32 are magnetized as set out in the above table to store the information set (11), then a "match" condition (indicated by a substantially zero voltage in the sense line 32) will be achieved by simultaneously energizing drive lines 26 and 38 (columns *a* and *e*) by means of their respective drivers 27 and 39. Other information sets can be similarly searched by energizing the drive lines corresponding to the *x*'s in the search section of the table. In all other respects, the operation is similar to that described with respect to a three drive bit position. It is apparent however that column (*e*) of the table indicates that irrespective of the information set stored in the memory, the section 43 (FIGURE 3) is magnetized as a binary "one"; similarly, irrespective of the information set searched, the drive line 38 is always one of two drive lines energized. Therefore, the drive line 38 can be replaced by a bias voltage, which is a part of the detector circuit. In this event, the operation follows the techniques discussed above in changing the representation of a bit position from a three drive line to a two drive line arrangement.

In summary, the instant invention provides a technique of combining thin film, plated wires together with non-magnetic drive lines in an associative memory. Unlike conventional location addressed systems, all information stored in an associative memory is searched at one time. To achieve this result, the plated wire associative memory is in effect transposed 90 degrees, that is, the plated wire contains all the bits of one word, thus serving as a word register while the non-magnetic drive line serves as a bit drive line.

In further summary, a single bit position of the associative memory provided by the instant invention is represented by three drive lines placed orthogonally to a single sense line. The magnetic plated wires at the intersections with respective drive lines are magnetized in accordance with a code or binary datum that will represent an information "one" bit or information "zero" bit. When the memory bit position is searched therefor by selectively energizing two of the three drive lines, a substantially "no voltage" condition at the sense line indicates that a "match" has been obtained, whereas a voltage induced in the sense line indicates a "mismatch" condition. Refinements can be made with the basic three drive line configuration by either subtracting, or adding drive lines.

Obviously, many modifications and variations of the present invention are possible in the light of the above teaching. It is therefore to be understood that within the scope of the appended claims, the invention may be practiced otherwise than as specifically described.

The embodiments of the invention in which an exclusive property or privilege is claimed are defined as follows.

We claim:

1. A search memory comprising:

(a) a reference magnetic memory cell producing a first signal for storing a magnetic flux in one direction;

(b) a plurality of magnetic memory cells each producing a second signal for each bit of binary data to be stored, at least one of said plurality of cells storing a magnetic flux in an opposite direction to said reference cell, the cell storing the opposite magnetic flux being indicative of the binary data being stored, said first and second signals being substantially equal in magnitude;

(c) a sense line linking all of said memory cells, (d) means responsive to the binary information searched for to energize a particular one of said plurality of memory cells which store said binary data, and for simultaneously energizing said reference cell whereby the presence of a voltage or a no voltage in said sense line indicates a mis-match or a match condition, respectively, between the stored and the searched for information.

2. The search memory in accordance with claim 1 wherein said magnetic memory cell comprises a location along a magnetizable wire.

3. The search memory in accordance with claim 2 wherein said magnetizable wire has the property of uniaxial anisotropy.

4. The combination comprising:
(a) data storage means magnetizable in either a first or a second direction;
(b) sensing means linking said data storage means;
(c) a detector coupled to said sensing means;
(d) at least first, second and third conductors juxtaposed to said data storage means,
the intersection of said first conductor and said data storage means providing a first data storage position,
the intersection of said second conductor and said data storage means providing a second data storage position,
and the intersection of said third conductor and said data storage means providing a third data storage position,
(e) said first and second data storage positions being magnetized, respectively, in said first and second directions to store a first information bit,
and alternatively, said first and second data storage positions being magnetized, respectively, in said second and first direction to store a second information bit,
said third data storage positions being always magnetized in said first direction to provide a bias signal of a first polarity,
(f) means coupled to said first, second and third conductors to selectively energize said first and third conductors to search for said second information bit,
said energizing of said first conductor producing a signal in said sensing means of a second polarity substantially equal in magnitude to said bias signal having said first polarity,
and in the alternative, said last mentioned means selectively energizing said second and third conductors to search for said first information bit,
said energizing of said second conductor producing a signal in said sensing means of a second polarity substantially equal in magnitude to said bias signal of said first polarity,
said detector sensing substantially no signal in said sensing means if the information bit which is being searched and the information bit which is stored is identical.

5. The combination in accordance with claim 4 wherein said magnetizable wire has the property of uniaxial anistropy.

6. The arrangement comprising:
(a) data storage means magnetizable in either a first or second direction;
(b) sensing means linking said data storage means;
(c) a detector coupled to said sensing means;
(d) at least first, second, third, fourth and fifth conductors juxtaposed to said data storage means,
the intersection of said data storage means and said first, second, third, fourth and fifth conductors providing respectively, first, second, third, fourth and fifth data storage positions,
said second, third and fourth data storage positions being magnetized in a first direction and said first data storage position being magnetized in a second direction to form a first information signal,
alternatively, said first, third and fourth data storage positions being magnetized in a first direction, and said second data storage position being magnetized in a second direction to form a second information signal,
alternatively, said first, second and fourth data storage positions being magnetized in a first direction and said third data storage position being magnetized in a second direction to form a third information signal,
alternatively, said first, second, and third data storage positions being magnetized in a first direction and said fourth data storage position being magnetized in a second direction to form a fourth information signal,
said fifth data storage position being always magnetized in said first direction to provide a bias signal of a first polarity,
(e) means coupled to said first, second, third, fourth and fifth conductors to selectively energize in the alternative said first and fifth conductors, said second and fifth conductors, said third and fifth conductors, and said fourth and fifth conductors,
the selective energizing in the alternative of said first, second, third and fourth conductors producing a signal in said sensing means of a second polarity substantially equal in magnitude to said bias signal of said first polarity,
said detector sensing substantially no signal in said sensing means if the information signal which is being searched and the information signal which is stored is identical.

7. The combination comprising:
(a) a sensing means;
(b) data storage means coupled to said sensing means and magnetizable in either a first or second direction, said data storage means generating a signal in said sensing means by the read out of said storage means;
(c) a detector coupled to said sensing means;
(d) means connected to said detector to apply a bias signal thereto, said bias signal having substantially the same magnitude as said signal generated by the read out of said data storage means;
(e) at least first and second conductors oriented substantially orthogonal to said data storage means,
the intersection of said first conductor with said data storage means providing a first memory location,
and the intersection of said second conductor with said data storage means providing a second memory location,
said first and second memory location being respectively magnetized in a first and second direction to store a first binary information bit,
and in the alternative, said first and second memory locations being respectively magnetized in a second and first direction to store a second binary information bit,
(f) means coupled to first and second conductors to selectively energize said second conductor to produce a signal in said sensing means of opposite polarity to said bias signal applied to said detector when said first and second memory locations are magnetized respectively in said first and second directions,
said detector thereby producing substantially no output signal indicating that said first binary information bit is stored at said first and second memory locations,
(g) said means coupled to said first and second conductors selectively energizing said first conductor to produce a signal in said sensing means of opposite polarity to said bias signal applied to said detector when said first and second memory locations are magnetized respectively in said second and first directions,
said detector thereby producing substantially no output signal indicating that said second binary information bit is stored at said first and second memory locations.

8. The combination comprising:
(a) a sensing means;
(b) data storage means coupled to said sensing means and magnetizable in either a first or second direction, said data storage means generating a signal in said sensing means by the read out of said storage means;
(c) a detector means coupled to said sensing means,
(d) means connected to said detector means to apply a bias signal thereto, said bias signal having substantially the same magnitude as said signal generated by the read out of said data storage means;
(e) at least first, second, third and fourth conductors juxtaposed to said data storage means,
the intersection of said data storage means and said first, second, third and fourth conductors providing, respectively, first, second, third and fourth memory locations,
said second, third and fourth data storage positions being magnetized in a first direction and said first data storage position being magnetized in a second direction to store a first information signal,
(f) in the alternative, said first, third and fourth memory locations being magnetized in a first direction and said second data storage position being magnetized in a second direction to store a second information signal,
(g) in the alternative, said first, second and fourth memory locations being magnetized in a first direction and said third memory location being magnetized in a second direction to store a third information signal,
(h) in the alternative, said first, second and third data storage positions being magnetized in a first direction and said fourth memory location being magnetized in said second direction to store a fourth information signal, (i) means coupled to said conductors to selectively energize in the alternative said first, second, third and fourth conductors to produce a signal in said sensing means of opposite polarity to said bias signal applied to said detector,
said detector thereby producing substantially no output signal to indicate respectively, that said first, second, third and fourth information signals are stored at said first, second, third and fourth memory locations.

References Cited by the Examiner

UNITED STATES PATENTS

| | | | |
|---|---|---|---|
| 3,104,380 | 9/1963 | Haibt | 340—174 |
| 3,105,962 | 10/1963 | Bobeck | 340—174 |
| 3,133,271 | 5/1964 | Clemons | 340—174 |
| 3,173,132 | 3/1965 | Bobeck | 340—174 |
| 3,182,296 | 5/1965 | Baldwin et al. | 340—174 |

OTHER REFERENCES

Pages 109 and 110, March 1961, IBM Technical Disclosure Bulletin, "Word Oriented Memory," by G. D. Bruce et al., vol. 3, No. 10.

Pages 106–121, April 1961, IBM Journal, "Magnetic Associative Memory," by Kiseda et al.

Pages 64–66, May 1962, IBM Technical Disclosure Bulletin, "Logical Circuits and Memory," by Scriver, Jr. et al., vol. 4, No. 12.

BERNARD KONICK, *Primary Examiner.*

IRVING L. SRAGOW, S. M. URYNOWICZ, *Assistant Examiners.*